(12) United States Patent
Mitze

(10) Patent No.: US 9,539,635 B2
(45) Date of Patent: Jan. 10, 2017

(54) GRIPPER HEAD FOR GRIPPING ARRANGEMENTS FOR MANIPULATING LONG WORKPIECES, DEVICE FOR FEEDING LONG WORKPIECES INTO AND REMOVING SAME FROM A PROCESSING MACHINE AND METHOD FOR BEND-STRAIGHTENING LONG WORKPIECES

(75) Inventor: Manfred Mitze, Wetter (DE)

(73) Assignee: M A E Maschinen- und Apparatebau Gotzen GmbH, Erkrath (DE)

( * ) Notice: Subject to any disclaimer, the term of this patent is extended or adjusted under 35 U.S.C. 154(b) by 674 days.

(21) Appl. No.: 13/810,114

(22) PCT Filed: Aug. 30, 2011

(86) PCT No.: PCT/EP2011/004360
§ 371 (c)(1),
(2), (4) Date: Mar. 13, 2013

(87) PCT Pub. No.: WO2012/028297
PCT Pub. Date: Mar. 8, 2012

(65) Prior Publication Data
US 2013/0180307 A1 Jul. 18, 2013

(30) Foreign Application Priority Data
Aug. 30, 2010 (DE) .................... 20 2010 011 975 U

(51) Int. Cl.
*B25B 5/14* (2006.01)
*B21D 43/00* (2006.01)
(Continued)

(52) U.S. Cl.
CPC ............... *B21D 43/006* (2013.01); *B21D 3/00* (2013.01); *B21D 3/10* (2013.01); *B25J 15/0028* (2013.01)

(58) Field of Classification Search
CPC .............. B25B 1/103; B25B 1/20; B25B 5/04; B25B 1/00
See application file for complete search history.

(56) References Cited

U.S. PATENT DOCUMENTS 4,530,508 A * 7/1985 Ferraro ............. B23B 31/16295
269/99
5,573,229 A * 11/1996 Lycan ................ B23K 37/0533
269/43
(Continued)

FOREIGN PATENT DOCUMENTS

BE 383151 11/1931
DE 2207336 8/1973
(Continued)

OTHER PUBLICATIONS

International Search Report, Nov. 8, 2011; MAE Maschinen U Apparatebau Goetzen; PCT/EP2011/004359.
International Search Report; Nov. 8, 2011; Cano Palmero, A.

Primary Examiner — Lee D Wilson
(74) Attorney, Agent, or Firm — Fay Sharpe LLP

(57) ABSTRACT

The invention relates to a gripping head for grasping devices for manipulating a long workpiece in a horizontal arrangement. A gripping head with two clamping jaws which can be adjusted independently of one another can be used. In addition, a device for feeding long workpieces into a processing machine, and discharging them therefrom is proposed. At least one of the grasping devices may have a gripping head for gripping in a frictionally locking fashion one end of the workpiece which is conveyed here by the horizontal conveying means, and drive means for pulling the workpiece to be straightened into the processing section and for pushing the straightened workpiece out onto the at least one horizontal conveying means by means of the gripping head.

9 Claims, 8 Drawing Sheets

(51) Int. Cl.
*B21D 3/10* (2006.01)
*B21D 3/00* (2006.01)
*B25J 15/00* (2006.01)

(56) References Cited

U.S. PATENT DOCUMENTS

| | | | |
|---|---|---|---|
| 5,980,191 A | 11/1999 | Trible | |
| 7,290,760 B1 * | 11/2007 | Lindsay | B25B 1/22 269/43 |
| 7,300,043 B1 * | 11/2007 | Lindsay | B25B 1/22 269/75 |
| 2008/0073822 A1 * | 3/2008 | Wong | B25B 5/142 269/41 |
| 2010/0164158 A1 * | 7/2010 | Weissenborn | A63C 11/26 269/101 |
| 2013/0180307 A1 * | 7/2013 | Mitze | B21D 3/10 72/372 |

FOREIGN PATENT DOCUMENTS

| | | |
|---|---|---|
| DE | 3601075 | 4/1987 |
| DE | 3834546 | 4/1990 |
| DE | 4022095 | 1/1992 |
| DE | 19725033 | 1/1999 |
| DE | 10114263 | 4/2002 |
| DE | 10144135 | 7/2003 |
| DE | 202006008001 | 9/2007 |
| JP | 57001520 | 1/1982 |

* cited by examiner

GRIPPER HEAD FOR GRIPPING ARRANGEMENTS FOR MANIPULATING LONG WORKPIECES, DEVICE FOR FEEDING LONG WORKPIECES INTO AND REMOVING SAME FROM A PROCESSING MACHINE AND METHOD FOR BEND-STRAIGHTENING LONG WORKPIECES

FIELD OF THE INVENTION

The invention relates to a gripping head having the features of the preamble of claim 1; a device for feeding long workpieces into a processing machine, and discharging them therefrom, having the features of the preamble of claim 10 or 11, and a method for bend-straightening long workpieces having the features of the preamble of claim 12.

TECHNOLOGICAL BACKGROUND

Devices and/or methods for moving workpieces, in particular, linearly, i.e. horizontally or vertically in processing machines can be found in DE 101 14 263 C1, DE 36 01 075 C1 and DE 38 34 546 A1.

Bend-straightening machines in which a long workpiece is supported vertically only at its ends in different workpiece positions at least between the bend-straightening steps are known from DE 101 44 135 C1. For this purpose, use is made of, in each case, a grasping device which has a gripping head and which also permits the workpiece to rotate about its longitudinal axis and which defines a processing section in the straightening press. The straightening press can be moved into the respectively desired bend-straightening positions along the workpiece which is supported only at its ends. In order to grasp workpieces of differing lengths, the grasping devices have variable spacing along the processing section. The workpiece which is to be processed can basically be inserted into its supports on the grasping devices by means of a crane device. This work-intensive charging process of the bend-straightening machine can be simplified by virtue of the fact that the grasping devices have pivoting means which permit a workpiece which is held ready next to the processing section and parallel thereto to be grasped and pivoted, in an approximately 180 degree pivoting step from the feeding-in position transverse with respect to its longitudinal direction into the processing section of the bend-straightening machine. At present, it is conventional to feed radially with the lifting means or the like. The last-mentioned bend-straightening machines from which the invention proceeds are marketed by the applicant as their ASV-L series. The bend-straightening process takes place automatically over the entire length of the workpiece and with high precision.

SUMMARY OF THE INVENTION

In order to be able to simplify the manipulation, in particular feeding in and discharging as well as, if appropriate, also the turning of large workpieces in a production line and/or processing line which can, in particular, also comprise a bend-straightening machine for long workpieces, and, in particular, to be able to integrate the straightening system into continuous line production, a gripping head having the features of claim 1 is proposed. Accordingly, there is provision that the gripping head has two clamping jaws which can be adjusted independently of one another and can be rotated about a center of rotation of the gripping head. The center of rotation of the gripping head is located within the gripping head and ideally coincides with a center point axis of the workpiece. As a result, it becomes possible, inter alia, to feed in a long workpiece which is conveyed on a horizontal conveying means, such as a roller way, in the longitudinal direction of said workpiece, independently of the cross section thereof, as a straight prolongation of a processing section. The gripping head can for this purpose permit frictionally locking gripping of an end region of the long workpiece which is conveyed here by the horizontal conveying means. In addition it is possible to provide for the unstraightened workpiece to be pulled into the processing section by means of the gripping head and a drive means. In order to discharge the long workpiece out of the bend-straightening machine, the gripping head can push the straightened workpiece onto the same horizontal conveying means, or a horizontal conveying means located opposite, as a straight prolongation of the processing section. Correspondingly, at least one of the grasping devices can be moved virtually along the entire processing section together with the long workpiece, held tight by its gripping head, along the processing section. The gripping head is preferably configured in a continuously opened fashion on the inside. It is preferably closed on the circumferential side. This permits the workpiece to be fed through it over its entire length. The arrangement and dimensioning of the gripping head are preferably selected such that it can be moved through a press frame, in particular along the processing section.

As is already the case in the known bend-straightening machines of the ASV-L series from MAE, the two grasping devices for the workpiece ends may be vertically adjustable in order to lower the workpiece, in each case, onto the anvils of the bend-straightening machines in the various bend-straightening positions of said workpiece. However, the straightening anvils for supporting the long workpiece can instead also basically be raised and remain lowered along the processing section between the bend-straightening sections during the longitudinal movement of the bend-straightening machine. As is already provided in DE 101 44 135 C1 and the ASV-L series from MAE, the workpiece is supported by being grasped by the two grasping devices in each case at the ends independently of its length and is turned into any desired rotational position about the longitudinal direction of the workpiece.

The subject matter of the invention is also the device for feeding long workpieces into a processing machine, and discharging them therefrom, and a method for continuous line production and/or processing of long workpieces as claimed in claim 10 or 11, which are each of independently inventive significance.

While, according to the device for feeding in long workpieces and discharging them according to a first embodiment there is provision to permit the horizontal transportation of the long workpiece within the processing section by drive means for horizontally moving the gripping head, an alternative embodiment (according to claim 11) provides for roller blocks to be arranged between the two grasping devices, which roller blocks can be moved parallel to the grasping devices and consequently along the processing section. The roller blocks have horizontal supporting means, like rollers which correspond to a roller way and which can optionally be shifted under the processing section in such a way that they support the long workpiece at least while said workpiece is fed into the processing section and discharged therefrom. During the processing steps for the long workpiece, the horizontal supporting means can be shifted back transversely with respect to the processing section into a position in which they do not impede the processing machine. The propulsion movement of the workpiece can either take place by means of rotary drives at the rollers or alternatively in turn by means of the gripping head.

A gripping head which also permits long workpieces with a nonround cross section to be handled, and allows automatic bend-straightening thereof, and which is also of independently inventive significance, can be found in claims 3, 4, 5 and 8. The devices are suitable for processing workpieces of different lengths, wherein differences in the length between 3 m and 40 m, in particular between 4 m and 30 m, are possible.

The abovementioned and the claimed components which are described in the exemplary embodiments and are to be used according to the invention are not subject, in terms of their size, shape, material selection and technical design, to any particular exceptional conditions, with the result that the selection criteria which are known in the field of application can be used without restriction.

Further details, features and advantages of the subject matter of the invention can be found in the dependent claims and the following description of the associated drawing and table in which, for example, an exemplary embodiment of a bend-straightening machine, a feeding-in discharging device and a gripping head are presented. Individual features of the claims or of the embodiments can also be combined with other features of other claims and embodiments.

DETAILED DESCRIPTION OF EXEMPLARY EMBODIMENTS

Figure 1:
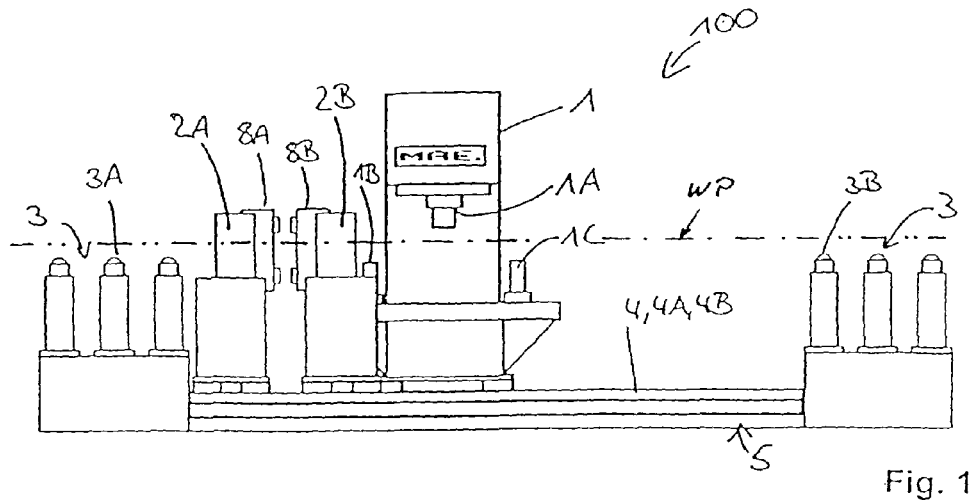
FIG. 1 shows a bend-straightening machine in a side view without a workpiece.

As is apparent from FIG. 1, a bend-straightening machine which is denoted in its entirety by 100 comprises a press frame 1 which can be moved horizontally along guide rails 4, 4A, 4B and has a vertically acting straightening head 1A and vertically acting straightening anvils 1B, 1C with variable spacing. Two grasping devices 2A, 2B are, like the press frame 1, displaceable longitudinally along the guide rails 4, 4B of a machine base 5 in a motor-driven fashion. It is alternatively possible to provide that the press frame 1 is arranged in a stationary fashion which is not illustrated in the figures.

Figure 3A:
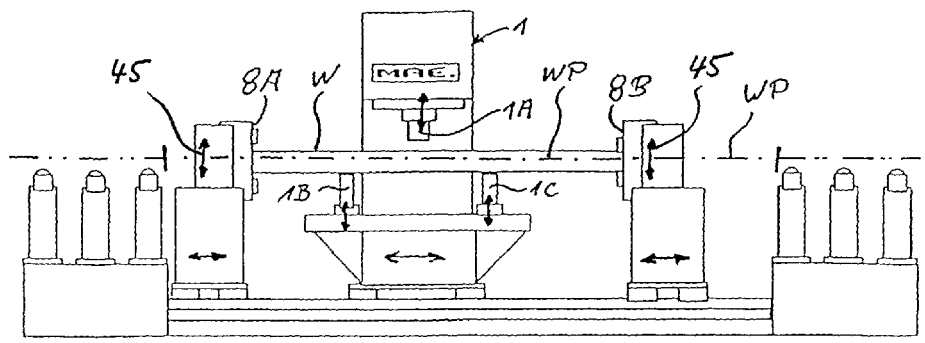
FIGS. 3A-E show the same bend-straightening machine with a workpiece in its bend-straightening position: before the second gripping head (FIG. 3A) closes, with both gripping heads closed (FIG. 3B), with the second gripping head (FIG. 3C) opened, and in a view from above (FIG. 3D) and during the discharging of the long workpiece (FIG. 3E)
Figure 3B:
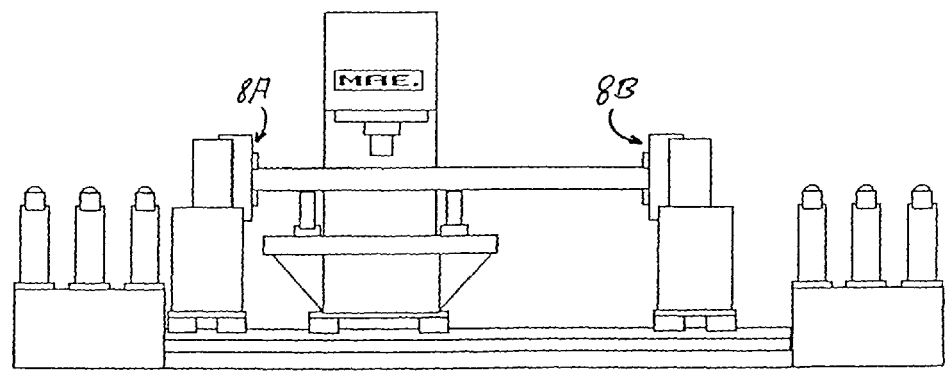
Figure 3C:
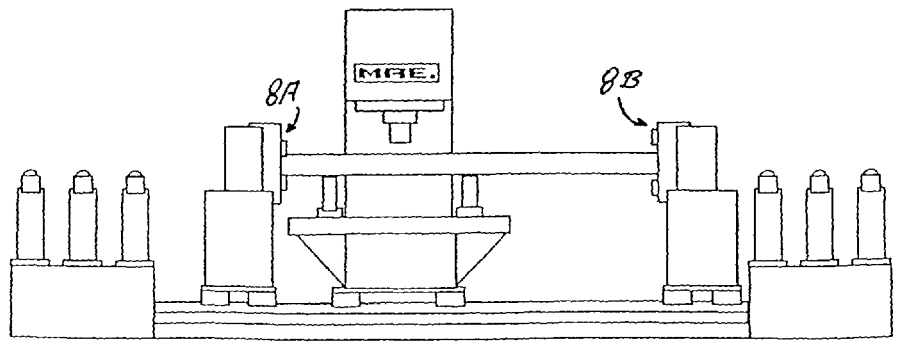

The grasping devices 2A and 2B define, together with the straightening head 1A and the straightening anvils 1B and 1C a processing section WP (represented by dot-dashed lines) which coincides with the workpiece W which is clamped in for the purpose of processing (FIGS. 3A-C). Correspondingly, the processing zone which is defined by the straightening head 1A and straightening anvils 1B, 1C is a partial section of the processing section WP. As a result of the mobility of the press frame 1 along the processing section WP and of the guide rails 4, 4A, 4B parallel thereto, the bend-straightening zones can be correspondingly shifted along the processing section. The processing section WP also passes (according to the definition) entirely or partially through the gripping heads 8A, 8B, which are provided on the grasping devices 2A and 2B and are also described in more detail further below, for the purpose of supporting and driving in rotation the horizontally arranged workpiece W. Consequently, the processing section WP is at least as long as the longest possible workpiece W, which can be processed in the bend-straightening machine, together with the length of the gripping heads.

In order to straighten deformations which occur directly at the workpiece end, it is, of course, also possible to move the straightening press beyond the gripping head and to move the straightening anvil/anvils under the workpiece end which projects out of the gripping head.

In each case a horizontal conveying means 3 extends at at least one head end WPA and/or WPB of the processing section WP, as is clear in particular from FIGS. 1 to 4, for example as a roller way 3A, 3B, as a left-hand and right-hand prolongation EPA and EPB of the processing section WP. Likewise, a horizontal conveying means 3 can also extend as just one of the two prolongations EPA or EPB (not illustrated).

Figure 2A:
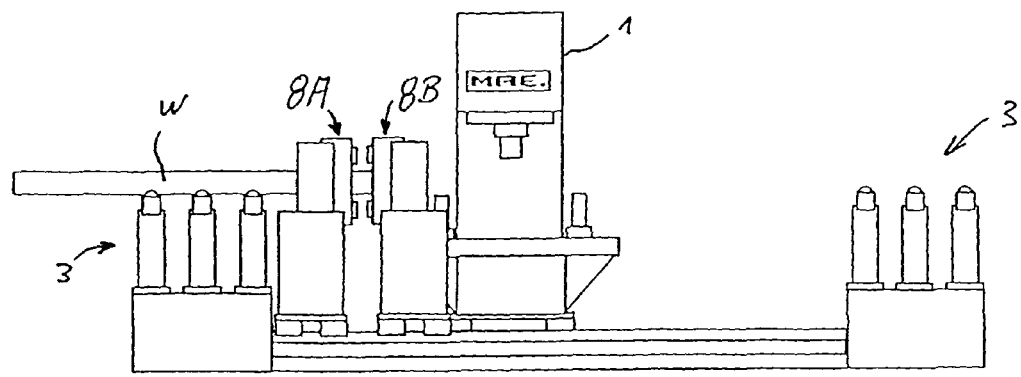
FIGS. 2 A/B show the same bend-straightening machine in a feeding-in position (FIG. 2A) and in the workpiece-gripping position (FIG. 2B)
Figure 2B:
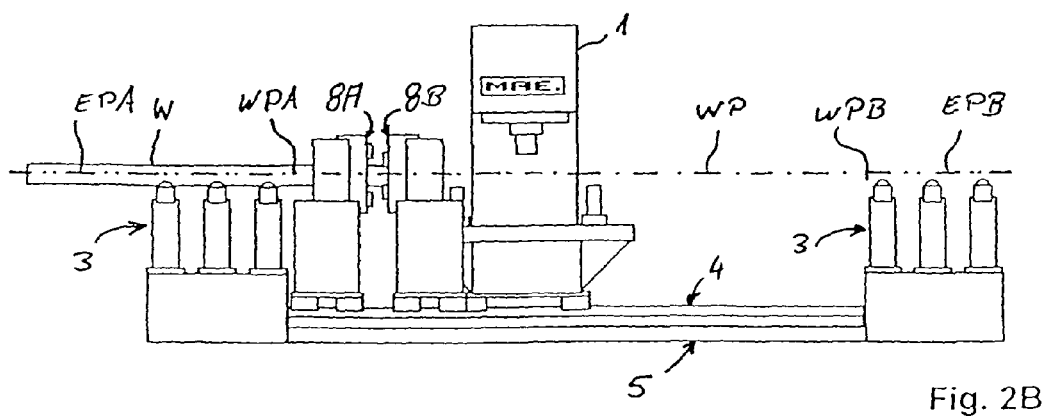

In the base position, illustrated in FIG. 2A/B, of the grasping devices 2A, 2B, the gripping zones of the gripping heads 8A, 8B are located with their center, in particular with their center of rotation, approximately in the center of the workpiece W. Owing to the vertical adjustability of the grasping devices, which can be implemented, for example, by vertical adjustability of the gripping heads, the height of the gripping head is set or pre-set in accordance with the thickness of the workpiece W, and the gripping head is therefore adapted to the height of the workpiece center relative to the roller way 3A, 3B. Basically, the height of the horizontal conveying means 3 can also be adapted. As is apparent from FIG. 2A/B, the workpiece W moves, when pushed in the direction of the processing section WP, over the end of the roller way 3A, with the result that said workpiece W projects out from the roller way. In this context, the right-hand end of the workpiece is pushed forward through the gripping head 8A, of the left-hand grasping device 2A in the drawing, as far as the gripping zone of the gripping head 8B in the right-hand grasping device 2B. Subsequently, the gripping or clamping means of the second gripping head 8B are moved against the end zone of the workpiece W which surrounds the right-hand workpiece end WB, and is clamped to said end zone. The gripping head 8B together with the workpiece W is then moved to the right along the processing section WP by means of the right-hand grasping device 2B. For this purpose, a suitable drive is provided. During this time, the gripping means of the left-hand grasping device 2A remain opened, with the result that the workpiece can be guided through the left-hand grasping device 2A more or less unimpeded.

From FIG. 3A it is apparent that the gripping head 8B is in a frictionally locking connection with the workpiece W and is already shifted along the guide rail 4B as far to the right as the workpiece length requires in order to be able to be subsequently also clamped in at its left-side end zone WA by the gripping head 8A, as is illustrated in FIG. 3B for bend-straightening processes. The gripping heads 8A/8B can rotate about the longitudinal axis of the workpiece, with the result that the workpiece can be measured and bend-straightened in a customary fashion. For this purpose, the press frame 1 moves along the processing section WP in order to arrive at all the necessary bend-straightening positions along the workpiece. For the pushing out of the workpiece W from the processing section WP which is necessary after the processing of the workpiece W has ended, the workpiece W can either be pushed back into the original position shown in FIG. 2A/B or pushed in the opposite direction onto the roller way 3B located opposite, as illustrated in FIG. 3C. For this purpose, the corresponding grasping device moves the gripping head (in the exemplary embodiment the left-hand one) along the processing section WP with the gripping head 8A closed and the gripping head 8B opened to the right.

In order to move contours of the press frame 1 which impede the gripping head out of the way of, for example, the straightening anvils or the straightening head, it may be necessary to raise and/or lower the workpiece W, for example along the vertical direction arrows 45. Alternatively or additionally, the anvils 1B, 1C and/or the straightening head 1A can also be moved, in particular, in the vertical direction in such a way that conveying in or out of the workpiece W is possible, or movement through at least one gripping head is possible.

Figure 3D:
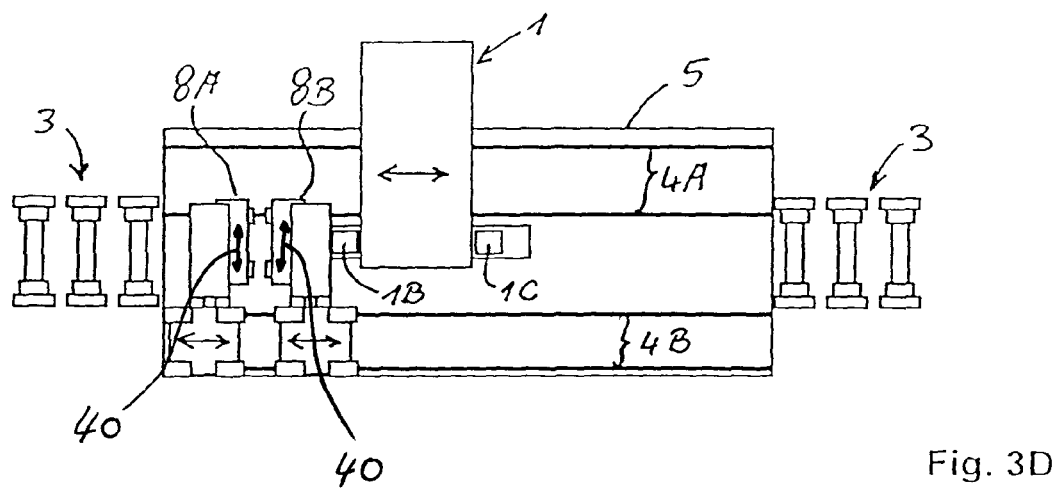

A plan view of a bend-straightening machine, in particular according to FIGS. 3A to 3C, can be seen in FIG. 3D. In order to be able to move out of the way of the contours of the press frame 1 with its components such as, for example, the straightening head 1A and/or the straightening anvils 1B, 1C when conveying the workpiece W in or out or when positioning or centering said workpiece W, it may be expedient if the gripping heads 8A, 8B or the grasping devices 2A, 2B can be moved in the horizontal direction in accordance with the direction arrows 40, transversely with respect to the processing section WP. Mobility of the gripping heads 8A, 8B or of the grasping devices 2A, 2B in all the spatial directions, in particular in the vertical direction (vertical adjustability), in the axial direction WP and/or in the horizontal direction along the direction arrows 40 (such as, for example, according to FIG. 9), i.e. substantially perpendicularly with respect to the guide rails 4A, 4B and rotationally about the center of rotation of the gripping head 8A, 8B, also serves to perform the centering of the workpiece W in the device 100, which is necessary for the bend-processing.

Figure 4A:
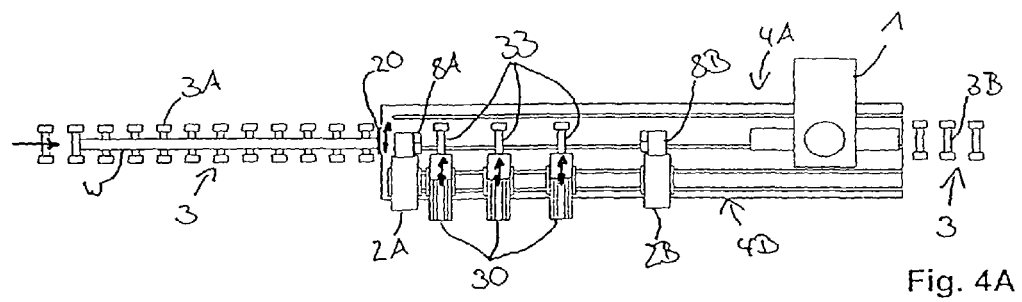
FIGS. 4A-E show an alternative embodiment of a processing station for long workpieces as a sequence in a view from above.
Figure 4B:
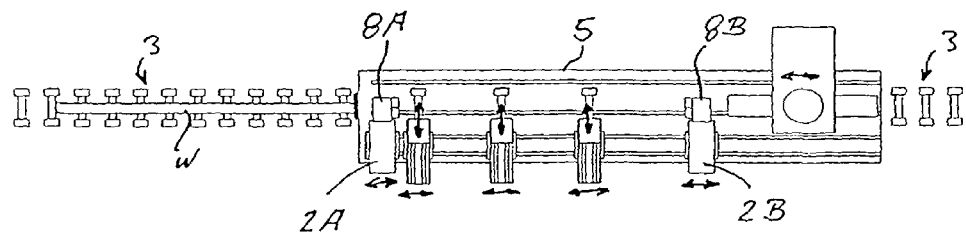
Figure 4C:
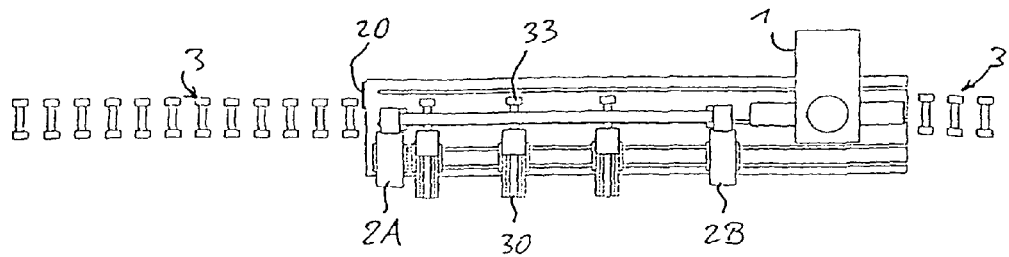
Figure 4D:
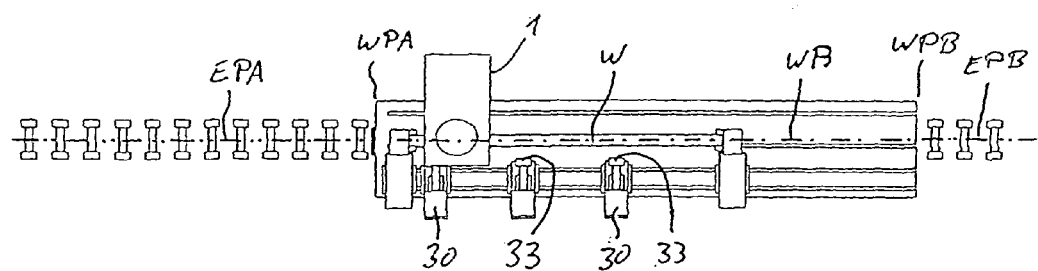
Figure 4E:
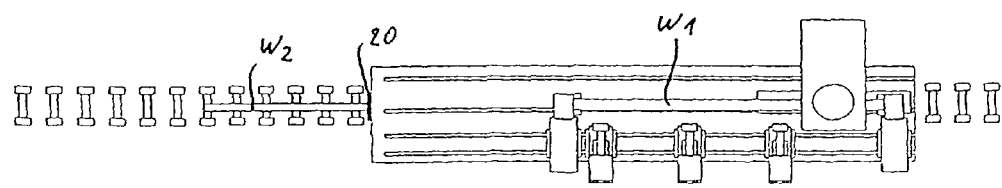

The transportation sequence according to FIGS. 4A-4E clarifies the horizontal conveyance of the long workpiece in an alternative embodiment: FIG. 4A shows a situation of feeding in a long workpiece W including the length measurement thereof. In accordance with the result of the length measurement, the position of two or more roller blocks 30, positioned between the grasping devices 2A/B, along the guide rail 4B is adapted to the workpiece length, as illustrated in FIG. 4B. The horizontal support means 33 which are associated with the roller blocks 30 can basically also be embodied as support rollers, such as are also used for the roller way 3A/3B. From FIG. 4C it is apparent how, when the barrier 20 is opened, the long workpiece W is shifted into the grasping position of the gripping heads, with support from the horizontal support means 33. The horizontal support means 33 are subsequently pulled back from their position underneath the processing section WP into a position shown in FIG. 4D. The processing of the long workpiece W can subsequently occur in various processing positions, as with a bend-straightening machine, while the long workpiece is temporarily clamped in at its end regions by the gripping heads 8A and 8B. From FIG. 4E it is apparent that after the processing of the long workpiece has taken place the latter can be shifted in its entirety together with the roller blocks 30 and the grasping devices 2A/B (to the right in the drawing). While the workpiece is subsequently transported away via a roller way 3B, it can be supported by means of the horizontal support means 33 which are again shifted under the processing section WP. A still unprocessed long workpiece of a different length and/or with a different cross section is already moved forward in this illustration through the roller way 3A as far as a barrier 20 for the next processing cycle. The propulsion movement of the workpiece can take place either by means of rotary drives on the rollers and/or in turn by means of the gripping head.

Figure 5:
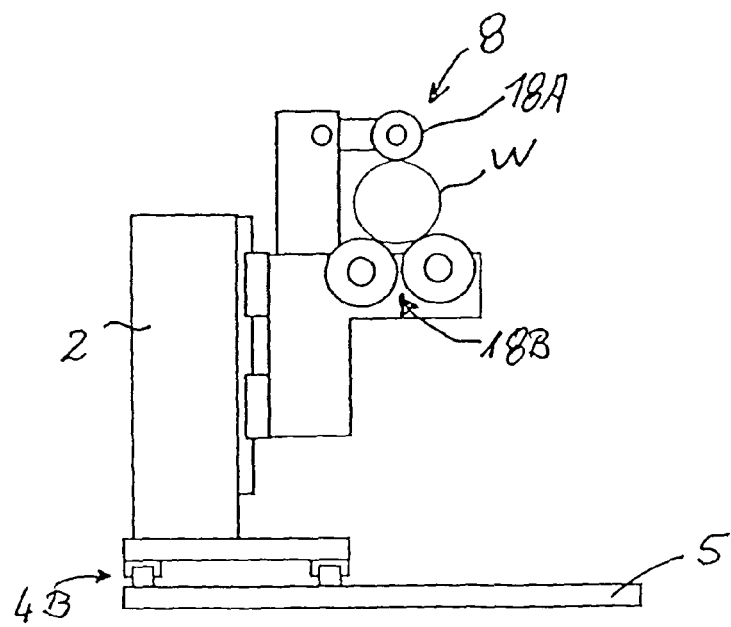
FIG. 5 shows an optional grasping device for a bend-straightening machine according to FIGS. 1 to 4.
Figure 3E:
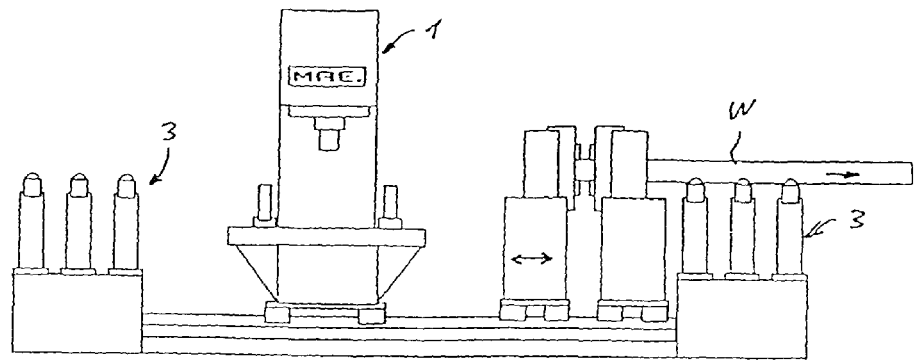
Figure 6:
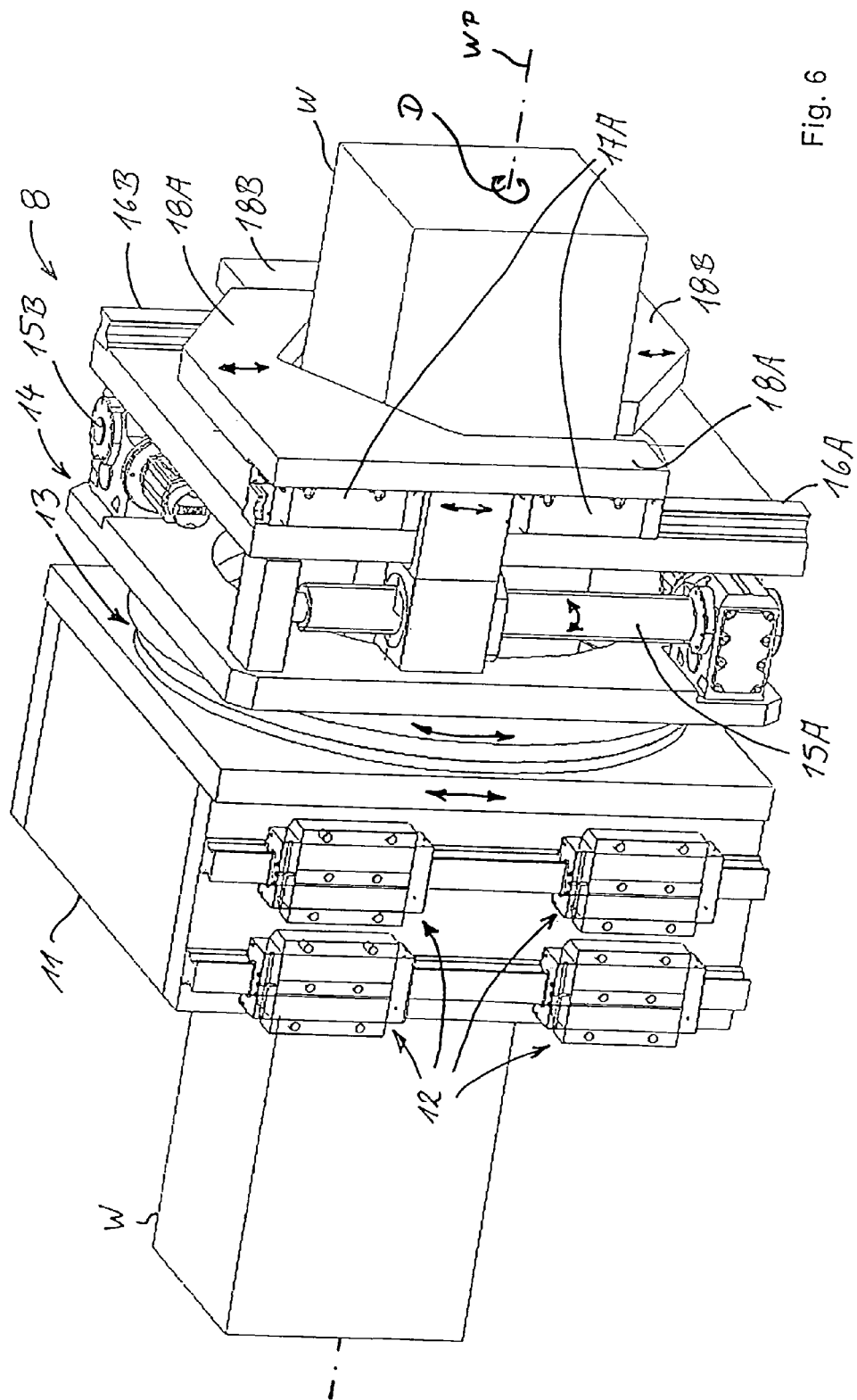
FIG. 6 shows an alternative grasping device for the linear processing of long workpieces.

As is apparent from FIG. 5, a three-point bearing by means of rollers can serve as a gripping head, as is already used in the ASV-L series from MAE. However, novel gripping heads, as illustrated in FIGS. 6 and 7 and described below, are preferred.

FIGS. 6 and 7A-C show a gripping head 8 in the manner of a two-jaw chuck. A base housing 11 is attached via vertically movable guide scales 12 to the grasping devices 2A, 2B which are known from FIGS. 1 to 4, and can be vertically adjusted with respect to the latter. The base housing 11 has a large-area central recess 11A for pushing through workpieces W which are to be processed. On its side facing the processing section WP, the base housing 11 is adjoined by a live ring 13 which bears a rotary head 14, which can rotate 360° about a center of rotation D in its circumferential direction. The live ring 13 is suitable for at least partially feeding through the workpiece W insofar as it comprises on the circumference a substantially closed, ring-like component, that has in the center at least one opening or a variable passage. The rotation between the base housing 11 and the rotary head 14 occurs by means of a circumferential toothing and a geared motor (not illustrated), wherein the rotary head 14 can rotate through 360° or else infinitely relative to the base housing 11. The rotary head 14 accommodates two motor-driven spindles 15A, 15B in a lateral orientation, and in the present, and in this regard preferred, case a non-central orientation. Each of the two spindles is connected to one of two clamping jaws 18A, 18B which are located opposite one another and are adjustable independently of one another along guide rails 16A, 16B and with guide carriages 17A, 17B. The guide rails 16A, 16B can be arranged on one of the sides of the workpiece W or (as illustrated) on various sides. The clamping jaws secure the workpiece W which can be moved in the axial direction through the chock without a collision by virtue of the open design for the purpose of loading and unloading. By means of the clamping jaws 18A, 18B, the workpiece W can be centered with its virtual workpiece axis, which is intended to come to be located in the processing section WP, from a clamping position into a processing position. The center of rotation D (i.e. its rotational axis) of the gripping head then coincides with the virtual or actual workpiece axis. Gripping heads with features of the type denoted above are of independently inventive significance.

Figure 7C:
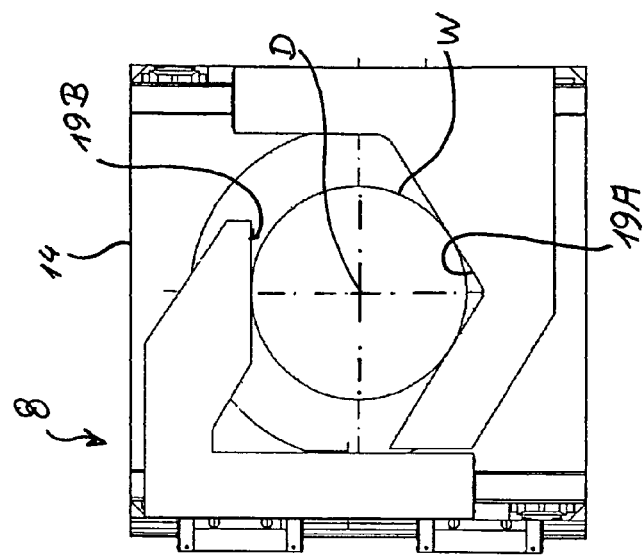
FIGS. 7A-C of the grasping device according to FIG. 6 show the gripping head in an end side view for processing longitudinal workpieces with different cross-sectional shapes.
Figure 7B:
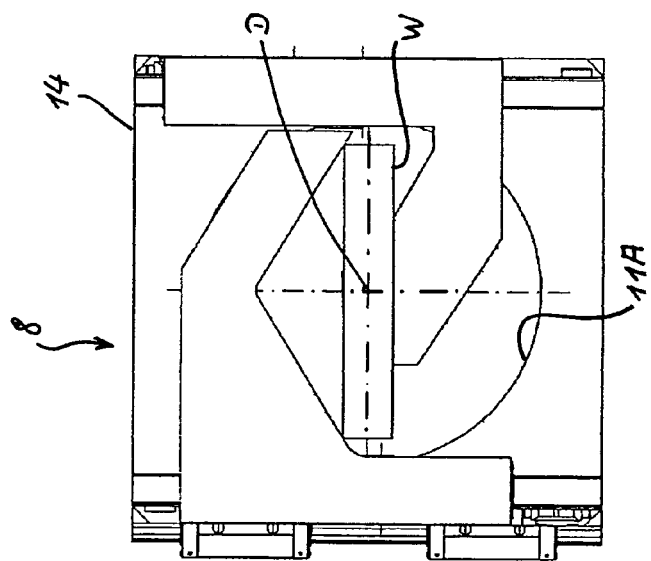
Figure 7A:
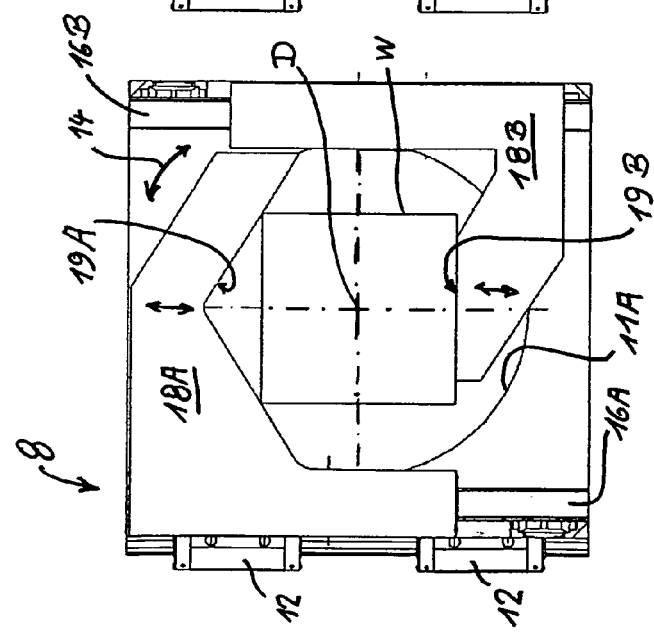

As is apparent from FIGS. 7A-C, it is possible to use the same pair of clamping jaws to clamp round, square, rectangular and other polygonal cross-sectional shapes of the workpiece. A large clamping range is covered, for example round and square rods in the range of dimensions from 120 to 150 mm or rectangular ones up to 120×600 mm, without manual intervention. The independent adjustability of the upper jaw and lower jaw equalizes the different jaw geometries 19A, 19B (prismatic at the top and straight at the bottom) and workpiece cross sections. Clamping jaws with features of the type denoted above are of independently inventive significance.

Although the gripping heads in the figures are represented with, in each case, two clamping jaws which are different from one another, it is also possible instead to use three or more clamping jaws which are different from one another, without departing from the inventive concept.

In the case of round rods, the prismatic jaw is rotated downward for the purpose of better centering. The free rotatability is particularly advantageous. Round rods can therefore be measured in a rotating fashion and shaping errors can therefore be filtered out better. The true running vectors on round rods can be positioned precisely upward, with the result that the straightening process proceeds in an optimum way.

Figure 8:
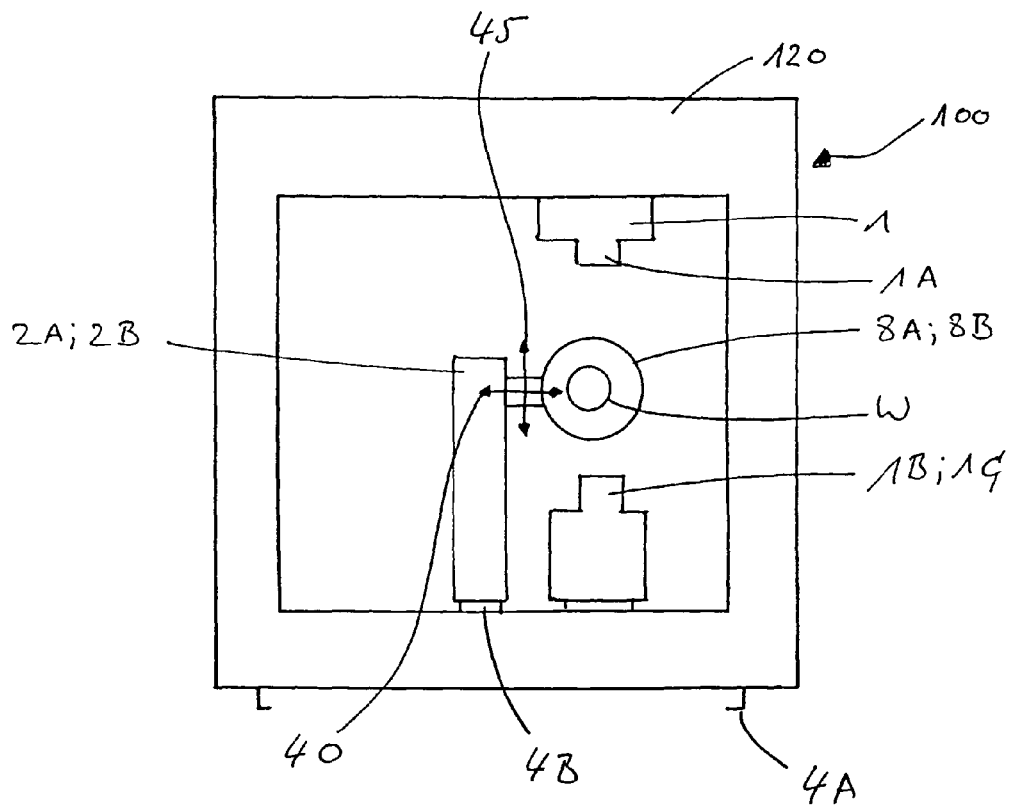
FIG. 8 shows an alternative design (O shape) of a bend-straightening machine in an end-side schematic illustration.

An end-side schematic view of a bend-straightening machine 100 with a closed machine frame 120 can be seen in FIG. 8. Arranged within the frame 120 is a guide rail 4B along which the gripping heads 8A, 8B and/or the grasping devices 2A, 2B can be moved. In order to be able to move out of the way of, in particular, the contours of the anvils 1B, 1C and/or of the straightening head 1A, the gripping heads 8A, 8B can be moved vertically along the direction arrows 40, 45, i.e. in the height direction and/or horizontally, i.e. substantially perpendicularly to the line of action of the straightening head 1A within the frame 120.

Figure 9:
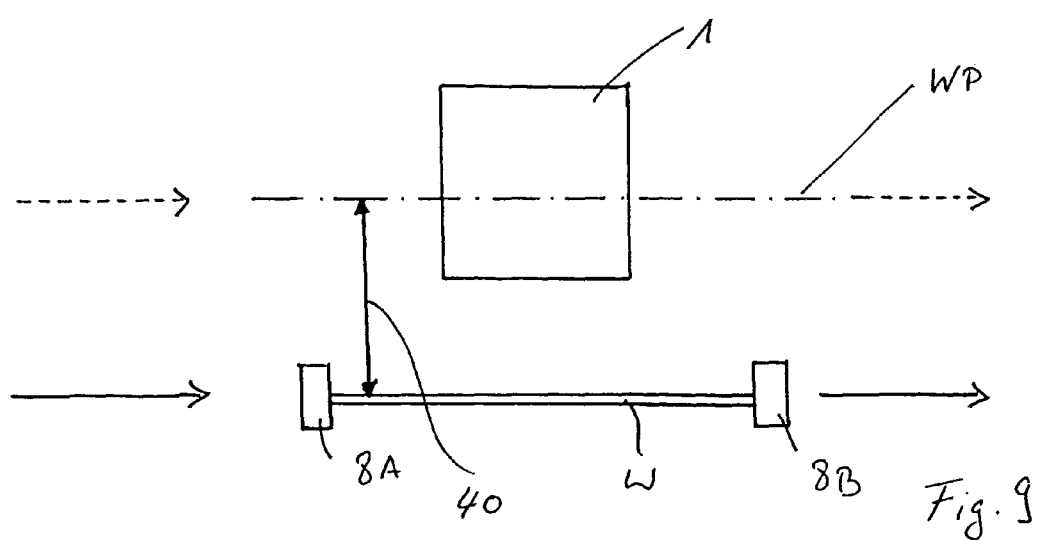
FIG. 9 shows a plan view of a laterally open bend-straightening machine (C shape) in a highly simplified schematic illustration.

A schematic, highly simplified illustration of a view of a bend-straightening machine 100 which is preferably open on one side can be seen in FIG. 9, wherein the frame of the machine can have an approximately C-shaped profile. The workpiece W can be fed in along the processing section WP. This corresponds to travel along the dashed line. Alternatively, the workpiece can firstly be arranged parallel to the processing section in front of the press frame 1 (i.e. in front of the opening of the C-shaped frame), along the travel according to the continuous line in FIG. 9, before said workpiece is then moved along the direction arrow 40 into the processing position, with the result that its position after this horizontal movement corresponds to the processing section WP. Collisions of the gripping heads 8A, 8B with the anvils or the straightening head can therefore be avoided.

LIST OF REFERENCE SYMBOLS

| 1 | Press frame | 17B | Guide carriage |
|---|---|---|---|
| 1A | Straightening head | 18A | Clamping jaw |
| 1B | Straightening anvil | 18B | Clamping jaw |
| 1C | Straightening anvil | 19A | Prismatic jaw geometry |
| 2A | Grasping device | 19B | Straight jaw geometry |
| 2B | Grasping device | 20 | Barrier |
| 3 | Horizontal conveying means | 30 | Roller blocks |
| | | 33 | Horizontal supporting |

LIST OF REFERENCE SYMBOLS

| 3A | Roller way | | means |
|---|---|---|---|
| 3B | Roller way | 40 | Horizontal direction arrow |
| 4 | Guide rails | | |
| 4A/B | Guide rails | 45 | Vertical direction arrow |
| 5 | Machine base | | |
| 8 | Gripping head | 100 | Bend-straightening machine |
| 8A | Gripping head | | |
| 8B | Gripping head | 120 | Machine frame |
| 11 | Base housing | | |
| 11A | Central recess | | |
| 12 | Guide scales | D | Center of rotation |
| 13 | Live ring | EPA | Prolongation |
| 14 | Rotary head | EPB | Prolongation |
| 15A | Spindle | W | Workpiece |
| 15B | Spindle | WA | Workpiece end |
| 16A | Guide rail | WB | Workpiece end |
| 16B | Guide rail | WP | Processing section |
| 17A | Guide carriage | WPA | Head end of processing section |
| | | WPB | Head end of processing section |

The invention claimed is:

1. A gripping head of a grasping device configured to releasably grasp a long workpiece at an end region of the workpiece and to manipulate the workpiece by turning a long workpiece in a horizontal arrangement, the gripping head has first and second clamping jaws which are adjustable independently of one another and can be rotated about a central axis of rotation of the gripping head, clamping geometries of the first and second clamping jaws differ from one another, the first and second clamping jaws configured to be both movable relative to one another to enable the workpiece to be clamped and unclamped by and between the first and second clamping jaws, the gripping head has first and second guide rails running laterally on the gripping head, the first and second guide rails spaced from one another and running parallel to one another, the first clamping jaw movably connected to the first guide rail, the second clamping jaw movably connected to the second guide rail, the first and second guide rails are positioned about the central axis of rotation of the gripping head, the first clamping jaw configured to slidably move on the first guide rail, the second clamping jaw configured to slidably move on the second guide rail, said gripping head includes a first and second motor, said first motor configured to cause said first clamping jaw to move on said first guide rail, said second motor configured to cause said second clamping jaw to move on said second guide rail.

2. A gripping head of a grasping device configured to releasably grasp a long workpiece at an end region of the workpiece and to manipulate the workpiece by turning a long workpiece in a horizontal arrangement, the gripping head has first and second clamping jaws which are adjustable independently of one another and can be rotated about a central axis of rotation of the gripping head, clamping geometries of the first and second clamping jaws differ from one another, the first and second clamping jaws configured to be both movable relative to one another to enable the workpiece to be clamped and unclamped by and between the first and second clamping jaws, the first clamping jaw has a prismatic clamping geometry, and the second clamping jaw has a flat clamping geometry.

3. The gripping head as claimed in claim 1, including a rotational head, the first and second clamping jaws being rotatably connected to the rotational head to enable the first and second clamping jaws to rotate about the central axis of rotation of the gripping head, the rotational head including an opening along a longitudinal length of the rotation head and wherein the central axis of rotation of the gripping head passes through the opening and is parallel to a central axis of the opening.

4. The gripping head as claimed in claim 1, wherein the first clamping jaw has a prismatic clamping geometry, and the second clamping jaw has a flat clamping geometry.

5. The gripping head as claimed in claim 4, including a rotational head, the first and second clamping jaws being rotatably connected to the rotational head to enable the first and second clamping jaw to rotate about the central axis of rotation of the gripping head, the rotational head including an opening along a longitudinal length of the rotation head and wherein the central axis of rotation of the gripping head passes through the opening and is parallel to a central axis of the opening.

6. The gripping head as claimed in claim 2, wherein the second clamping jaw has a straight geometry portion having a single surface that contacts the workpiece when the workpiece is clamped between said first and second clamping jaws, the first jaw having a prismatic geometry portion having two surfaces that contact the workpiece when the workpiece is clamped between said first and second clamping jaws.

7. The gripping head as claimed in claim 5, wherein the second clamping jaw has a straight geometry portion having a single surface that contacts the workpiece when the workpiece is clamped between said first and second clamping jaws, the first jaw having a prismatic geometry portion having two surfaces that contact the workpiece when the workpiece is clamped between said first and second clamping jaws.

8. A gripping head of a grasping device configured to releasably grasp a long workpiece at an end region of the workpiece and to manipulate the workpiece by turning a long workpiece in a horizontal arrangement, the gripping head has first and second clamping jaws which are adjustable independently of one another and can be rotated about a central axis of rotation of the gripping head, clamping geometries of the first and second clamping jaws differ from one another, the first and second clamping jaws configured to be both movable relative to one another to enable the workpiece to be clamped and unclamped by and between the first and second clamping jaws, the gripping head has first and second guide rails running laterally on the gripping head, the first and second guide rails spaced from one another and running parallel to one another, the first clamping jaw movably connected to the first guide rail, the second clamping jaw movably connected to the second guide rail, the first clamping jaw includes a first leg that is connected to a first guide carriage, the first guide carriage is moveably connected to the first guide rail, the second clamping jaw includes a second leg that is connected to a second guide carriage, the second guide carriage is moveably connected to the second guide rail, the first leg and the second leg are configured to be spaced from the workpiece when the workpiece is clamped between the first and second clamping jaws.

9. The gripping head as claimed in claim 7, wherein the first clamping jaw includes a first leg that is connected to a first guide carriage, the first guide carriage is moveably connected to the first guide rail, the second clamping jaw includes a second leg that is connected to a second guide carriage, the second guide carriage is moveably connected to the second guide rail, the first leg and the second leg are configured to be spaced from the workpiece when the workpiece is clamped between the first and second clamping jaws.

* * * * *